Dec. 15, 1925.

R. V. L. HARTLEY 1,565,566

TRANSLATING DEVICE

Filed June 25, 1923

Inventor:
Ralph V. L. Hartley
by Joel C.R. Palmer Att'y.

Patented Dec. 15, 1925.

1,565,566

UNITED STATES PATENT OFFICE.

RALPH V. L. HARTLEY, OF SOUTH ORANGE, NEW JERSEY, ASSIGNOR TO WESTERN ELECTRIC COMPANY, INCORPORATED, OF NEW YORK, N. Y., A CORPORATION OF NEW YORK.

TRANSLATING DEVICE.

Application filed June 25, 1923. Serial No. 647,482. REISSUED

*To all whom it may concern:*

Be it known that I, RALPH V. L. HARTLEY, a citizen of the United States, residing at South Orange, in the county of Essex, State of New Jersey, have invented certain new and useful Improvements in Translating Devices, of which the following is a full, clear, concise, and exact description.

This invention relates to translating devices and has for its object to vary the intensity of a beam of light in response to variations in an electric current.

This object is attained by providing in combination with a light source, a pair of crossed light polarizing devices and interposing between the devices a piezo electric crystal which, when strained, rotates the plane of polarized light. The crystal is put under strain by impressing electrical oscillations thereon. The extent of rotation of the polarized light by the crystal is varied by modulating the electrical oscillations thereby varying the intensity of the transmitted beam.

This invention may be utilized, for example, to record sound on a photographic film by modulating the electrical oscillations applied to the crystal with voice waves and focusing the transmitted beam on a continuously moving film, resulting in the exposure thereof to light striations of varying intensities from which the record may be developed in the usual photographic manner.

Figure 1:
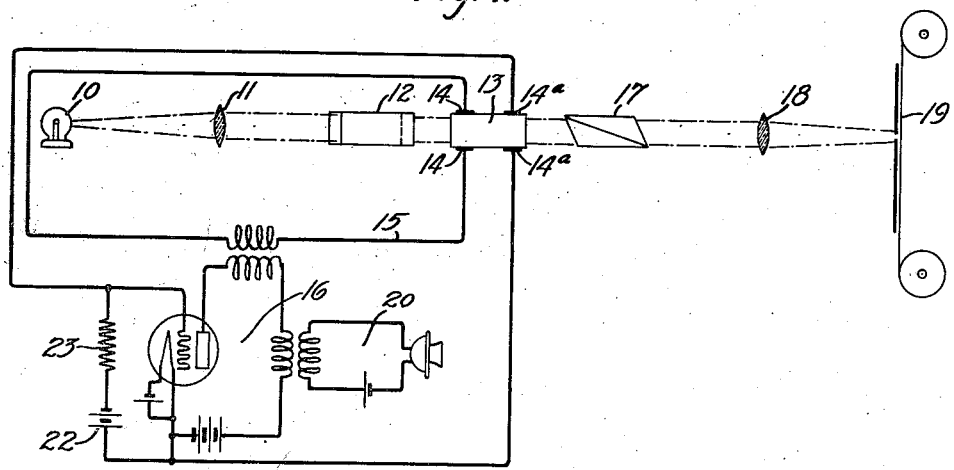

Referring now to the drawings Fig. 1 discloses diagrammatically a speech recording apparatus embodying the invention.

Figure 2:
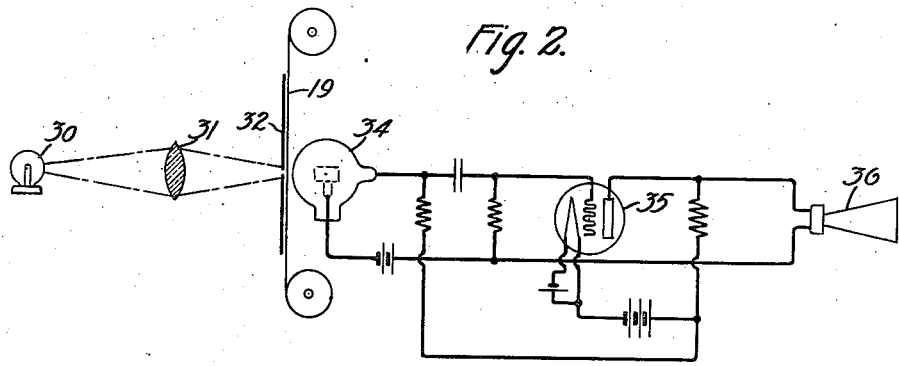

Fig. 2 discloses diagrammatically a reproducing apparatus.

In Fig. 1 light from a source 10 is condensed by a lens 11 and is directed against one face of a Nicol prism or other light polarizing device 12. Adjacent the opposite face of the prism 12 and arranged to receive light from the prism 12 is a piezoelectric crystal 13 having on opposite faces metallic deposits 14 to which are electrically connected the terminals of a circuit 15. The circuit 15 is inductively connected to the output circuit of a vacuum tube oscillator 16 whereby electrical oscillations may be impressed on the crystal 13. The impressing of oscillations on the crystal 13 sets up vibrations therein. The straining of the crystal due to its vibration causes rotation of the plane of polarized light transmitted to it twice during each cycle of vibration. A second Nicol prism or other light polarizing device 17 is arranged to receive light transmitted through the crystal 13 and is adjusted so that it is crossed with respect to the prism 12 when the crystal 13 is at rest. Thus when the crystal 13 is vibrated, light is transmitted from the source 10 through the combined prisms and crystal, and the amount of transmitted light is dependent upon the extent of vibration of the crystal. The beam of transmitted light is focused in the form of a thin band of light on a continuously moving photographic film 19 thereby resulting in exposure of successive portions of the film to the beam of transmitted light.

In order to utilize this device for recording speech the crystal 13 is caused to normally vibrate at its resonant frequency resulting in the transmission of a definite amount of light from the source 10 to the film 19. In order to insure the vibration of the crystal 13 at its resonant frequency, it is made to control the frequency of oscillation of the oscillator 16 by providing metallic deposits 14$^a$ on opposite surfaces of the crystal and connecting one surface to the grid of the oscillator and the other surface to the cathode of the oscillator, there being a battery 22 and a high resistance 23 shunted around the crystal. The crystal 13 acts to feed back energy from the circuit 15 to the grid circuit of the oscillator 16. Vibrations set up in the crystal 13 by electrical oscillations impressed thereon from the circuit 15 cause the generation of corresponding potentials between the electrodes 14$^a$ whereby the potential of the grid of the oscillator is varied. As the crystal 13 will react only to oscillations of its resonant frequency, it follows that the frequency generated by the oscillator 16 will be the resonant frequency of the crystal. The electrical oscillations impressed upon the crystal 13 to vibrate it are modulated with voice frequency electrical waves resulting in variations in the extent of vibration of the crystal 13. A corresponding variation in the amount of light transmitted to the film 19 results in the exposure thereof to successive light striations of varying intensities. The modulation of the high frequency oscillations impressed upon the crystal 13 is accomplished through the medium of a telephone circuit 20 inductively connected to the output circuit of the vacuum tube oscillator 16. Speech waves impressed upon this circuit are recorded on the film 19 in the form of varying exposures and when the film is developed in the ordinary photographic manner, it contains a record of the speech impressed upon the circuit 20.

The use of high frequency oscillators for vibrating the crystal 13 rather than applying the voice waves direct to the crystal is desirable although not absolutely essential as it permits the crystal to be strained at its resonant frequency, where owing to its very small damping it can be put in vibration with very little energy. This small damping and the corresponding sharp resonance make it desirable to use high frequency oscillations, for example, of the order of 500,000 cycles in order that the higher components of the voice wave may be preserved. This, however, has the practical advantage, that it permits the use of a relatively small crystal which is easier to procure than a large one. The chief disadvantage of applying the voice waves directly to the crystal is the extra power which would be needed for vibrating the crystal. The system above described is relatively free from interference due to mechanical jar, since the only moving parts involved execute their motions at radio frequencies and the motions are of one part of the crystal relative to another. Bodily vibration of the crystal as a whole has practically no effect upon the record.

Fig. 2 discloses an apparatus for reproducing speech from a film upon which a record has been made with the apparatus disclosed in Fig. 1. A source of light 30 is focused by means of the lens 31 on a slot in a screen 32 behind which is arranged the film 19. A photo-electric cell or other light sensitive device 34 is arranged to receive light passing through the film 19. Variations in the intensity of the light falling on the cell 34 result in corresponding electrical oscillations in the vacuum tube circuit 35, which variations are transmitted to a receiver or loud speaking device 36 resulting in a reproduction of the speech recorded on the film 19.

It is, of course, understood that although this invention has been disclosed in connection with making of photographic records of sound, the invention is not limited thereto but may be utilized wherever it is desirable to modulate a beam of light.

The invention claimed is:

1. In combination, a light source, a pair of crossed light polarizing devices, means responsive to electrical oscillations for rotating the plane of polarized light interposed between said devices, means for impressing high frequency oscillations on said light rotating means, and means for modulating said high frequency oscillations in response to speech frequencies.

2. In combination, a light source, a pair of crossed light polarizing devices, a piezo-electric crystal interposed between said devices, and means for supplying electrical oscillations thereto.

3. In combination, a source of light, a pair of cross light polarizing devices, a piezo-electric crystal interposed between said devices, means to supply high frequency electrical oscillations to said crystal, and means to modulate said high frequency oscillations with low frequency waves.

4. In combination, a source of light, a pair of crossed light polarizing devices, a piezo-electric crystal interposed between said devices, a vacuum tube oscillator for supplying high frequency oscillations to said crystal, and a telephone circuit inductively connected to said oscillator whereby said high frequency oscillations may be modulated with speech waves.

5. In combination, a light source, a pair of crossed light polarizing devices, a piezo-electric crystal interposed between said devices, and means to vibrate said crystal in response to voice waves.

6. In combination, a light source, a pair of crossed light polarizing devices, a piezo-electric crystal interposed between said devices, means to vibrate said crystal at its resonant frequency, and means to modulate said vibration in response to voice waves.

7. In an optical recording system, a source of modulated high frequency oscillations, and means actuated by oscillations from said source comprising an electromechanical device for producing a light beam having intensity modulations corresponding to the amplitude modulations of said oscillations.

In witness whereof, I hereunto subscribe my name this 15 day of June A. D., 1923.

RALPH V. L. HARTLEY.